US010422510B2

(12) United States Patent
(10) Patent No.: US 10,422,510 B2

Neuer et al.

(45) Date of Patent: Sep. 24, 2019

(54) LIGHT FIXTURE WITH PIVOTABLE OPTIC

(71) Applicant: Hubbell Incorporated, Shelton, CT (US)

(72) Inventors: Michael S. Neuer, Covina, CA (US); Dean B. Dal Ponte, Glendale, CA (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 15/408,898

(22) Filed: Jan. 18, 2017

(65) Prior Publication Data

US 2017/0205050 A1 Jul. 20, 2017

Related U.S. Application Data

(60) Provisional application No. 62/280,278, filed on Jan. 19, 2016.

(51) Int. Cl.

| | |
|---|---|
| ***B60Q 1/26*** | (2006.01) |
| ***F21V 14/02*** | (2006.01) |
| ***F21S 8/08*** | (2006.01) |
| ***F21V 14/04*** | (2006.01) |
| ***F21V 23/00*** | (2015.01) |
| ***F21V 19/02*** | (2006.01) |
| *F21Y 115/10* | (2016.01) |
| *F21V 5/00* | (2018.01) |
| *F21V 5/08* | (2006.01) |
| *F21V 13/04* | (2006.01) |

(52) U.S. Cl.

CPC ................ *F21V 14/02* (2013.01); *F21S 8/08* (2013.01); *F21S 8/081* (2013.01); *F21V 14/04* (2013.01); *F21V 19/02* (2013.01); *F21V 23/005* (2013.01); *F21V 5/007* (2013.01); *F21V 5/08* (2013.01); *F21V 13/04* (2013.01); *F21V 23/001* (2013.01); *F21Y 2115/10* (2016.08)

(58) Field of Classification Search

CPC ........ F21V 13/06; F21V 14/04; F21V 14/045; F21V 14/06; F21V 14/065; F21V 14/08; F21V 14/02; F21V 14/025

USPC .......................................................... 362/232

See application file for complete search history.

(56) References Cited

U.S. PATENT DOCUMENTS

| | | | |
|---|---|---|---|
| 4,135,231 | A | 1/1979 | Fisher |
| D549,362 | S | 8/2007 | To |
| D577,133 | S | 9/2008 | Xu |

(Continued)

OTHER PUBLICATIONS

Will Stone, "Custom LED Spiral Staircase Lighting", Makezine, Dec. 18, 2012, https://makezine.com/projects/custom-led-spiral-staircase-lighting/.*

(Continued)

*Primary Examiner* — Matthew J. Peerce

(74) *Attorney, Agent, or Firm* — Michael Best & Friedrich, LLP

(57) ABSTRACT

A light module for a light fixture includes a light assembly, a bezel extending at least partially around the light assembly and secured to the light assembly, and a pinion. The bezel and the light assembly are at least partially pivotable about a first axis. The bezel includes an outer surface and a first gear surface extending along at least a portion of the outer surface. The pinion includes a second gear surface engaging the first gear surface, and rotation of the pinion causes the bezel and the light assembly to rotate about the first axis.

16 Claims, 8 Drawing Sheets

(56) References Cited

U.S. PATENT DOCUMENTS

| | | | | |
|---|---|---|---|---|
| D597,227 | S | 7/2009 | Kim | |
| D613,432 | S | 4/2010 | Chen | |
| D616,130 | S | 5/2010 | Tortel | |
| D620,169 | S | 7/2010 | Schwartz | |
| 7,832,892 | B2 | 11/2010 | Xiao | |
| D634,455 | S | 3/2011 | Graf | |
| D638,974 | S | 5/2011 | Fuksas | |
| D642,723 | S | 8/2011 | Zheng | |
| D655,435 | S | 3/2012 | Howis | |
| D658,788 | S | 5/2012 | Dudik | |
| D713,082 | S | 9/2014 | Hermanseon | |
| 9,109,787 | B2 | 8/2015 | Nankil | |
| D741,514 | S | 10/2015 | Bukkems | |
| D742,558 | S | 11/2015 | Bukkems | |
| D745,991 | S | 12/2015 | Duquette | |
| D752,268 | S | 3/2016 | Paz | |
| D752,269 | S | 3/2016 | Paz | |
| D774,232 | S | 12/2016 | Nankil | |
| D774,243 | S | 12/2016 | Nankil | |
| 2002/0191396 | A1* | 12/2002 | Reiff | F21L 4/04 362/246 |
| 2005/0030753 | A1 | 2/2005 | Tickner et al. | |
| 2005/0219849 | A1 | 10/2005 | Kotovsky et al. | |
| 2006/0198152 | A1 | 9/2006 | Wechsler | |
| 2008/0074279 | A1* | 3/2008 | Chiu | B60Q 1/2611 340/815.45 |
| 2009/0296368 | A1 | 12/2009 | Ramer | |
| 2009/0323342 | A1 | 12/2009 | Liu | |
| 2010/0118539 | A1 | 5/2010 | Leary et al. | |
| 2011/0228517 | A1 | 9/2011 | Kawabat et al. | |
| 2012/0026732 | A1* | 2/2012 | Fricke | F21V 14/02 362/231 |
| 2014/0204218 | A1 | 7/2014 | Gebhard et al. | |
| 2014/0268771 | A1 | 9/2014 | Heikman | |
| 2015/0285472 | A1 | 10/2015 | Evitt | |
| 2015/0330609 | A1 | 11/2015 | Ahrari et al. | |
| 2016/0061393 | A1 | 3/2016 | Ngai | |

OTHER PUBLICATIONS

Ingo Maurer “Mid-Century Modern Steel Spring Floor Lamp”, 1968, 1stdibs.com, https://www.1stdibs.com/furniture/lighting/table-lamps/mid-century-modern-steel-spring-floor-lamp-ingo-maurer-germany-1968/id-f_11957831/ (Year: 1968).*

International Search Report and Written Opinion for Application No. PCT/US2017/013906 dated Mar. 31, 2017 (10 pages).

International Search Report and Written Opinion for Application No. PCT/US2017/013898 dated Mar. 31, 2017 (11 pages).

* cited by examiner

LIGHT FIXTURE WITH PIVOTABLE OPTIC

CROSS-REFERENCE TO RELATED APPLICATIONS

This application claims the benefit of prior-filed, co-pending U.S. Provisional Patent Application No. 62/280,278, filed Jan. 19, 2016, the entire contents of which are hereby incorporated by reference.

BACKGROUND

The present application relates to light fixtures, and particularly to light fixtures with an adjustable optic.

SUMMARY

Conventional light fixtures include one or more light-emitting elements. These light-emitting elements may include a light-emitting diode or LED. The light-emitting elements may be secured to the fixture in a specific orientation such that the emitted light is aimed in a desired direction.

In one aspect, a light module for a light fixture includes a light assembly, a bezel extending at least partially around the light assembly and secured to the light assembly, and a pinion. The bezel and the light assembly are at least partially pivotable about a first axis. The bezel includes an outer surface and a first gear surface extending along at least a portion of the outer surface. The pinion includes a second gear surface engaging the first gear surface, and rotation of the pinion causes the bezel and the light assembly to rotate about the first axis.

In another aspect, a light fixture includes a support structure including a socket and a light module positioned within the socket. The light module includes a light assembly, a bezel extending at least partially around the light assembly and secured to the light assembly, and a pinion. The bezel and the light assembly are at least partially pivotable about a first axis. The bezel includes an outer surface and a first gear surface extending along at least a portion of the outer surface. The pinion includes a second gear surface engaging the first gear surface, and rotation of the pinion causes the bezel and the light assembly to rotate about the first axis.

Other aspects of the application will become apparent by consideration of the detailed description and accompanying drawings.

DETAILED DESCRIPTION

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical or hydraulic connections or couplings, whether direct or indirect. Also, electronic communications and notifications may be performed using any known means including direct connections, wireless connections, etc.

Figure 1:
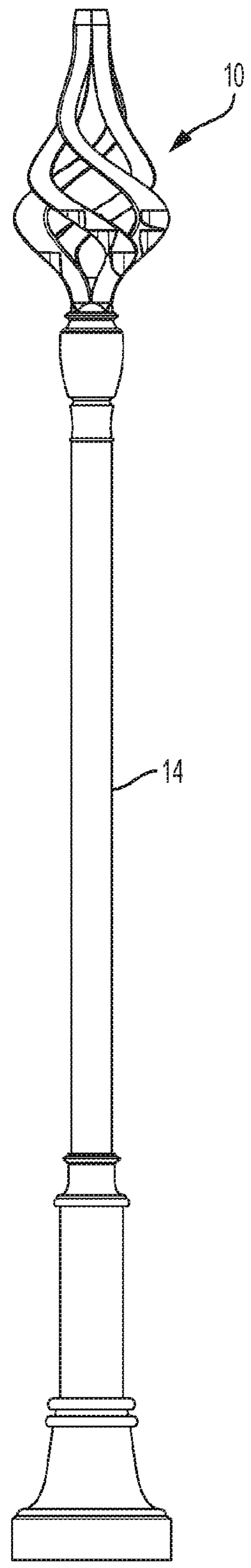
FIG. 1 is a side view of a light fixture secured to a pole.
Figure 2:
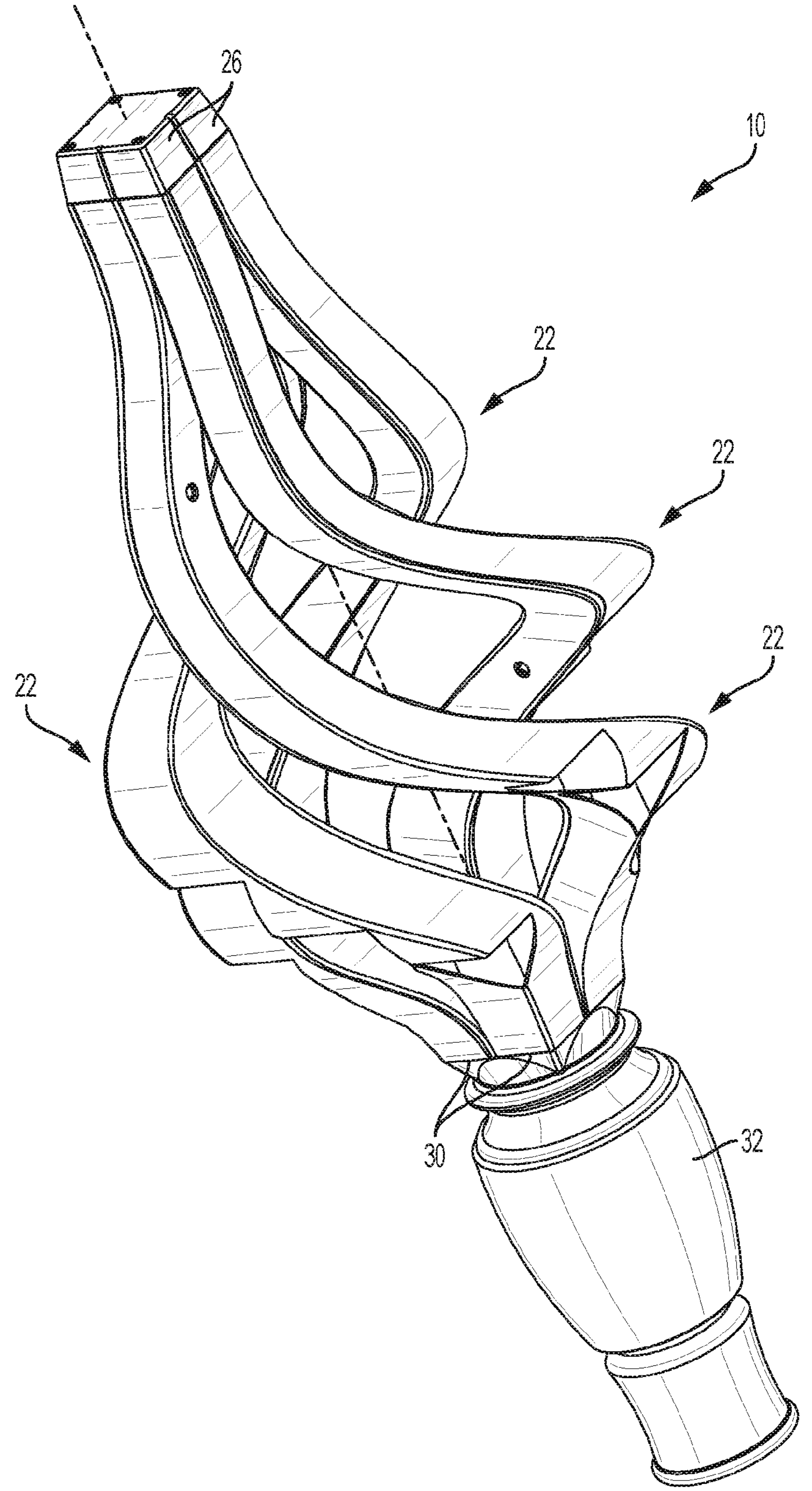
FIG. 2 is a perspective view of the light fixture of FIG. 1.
Figure 3:
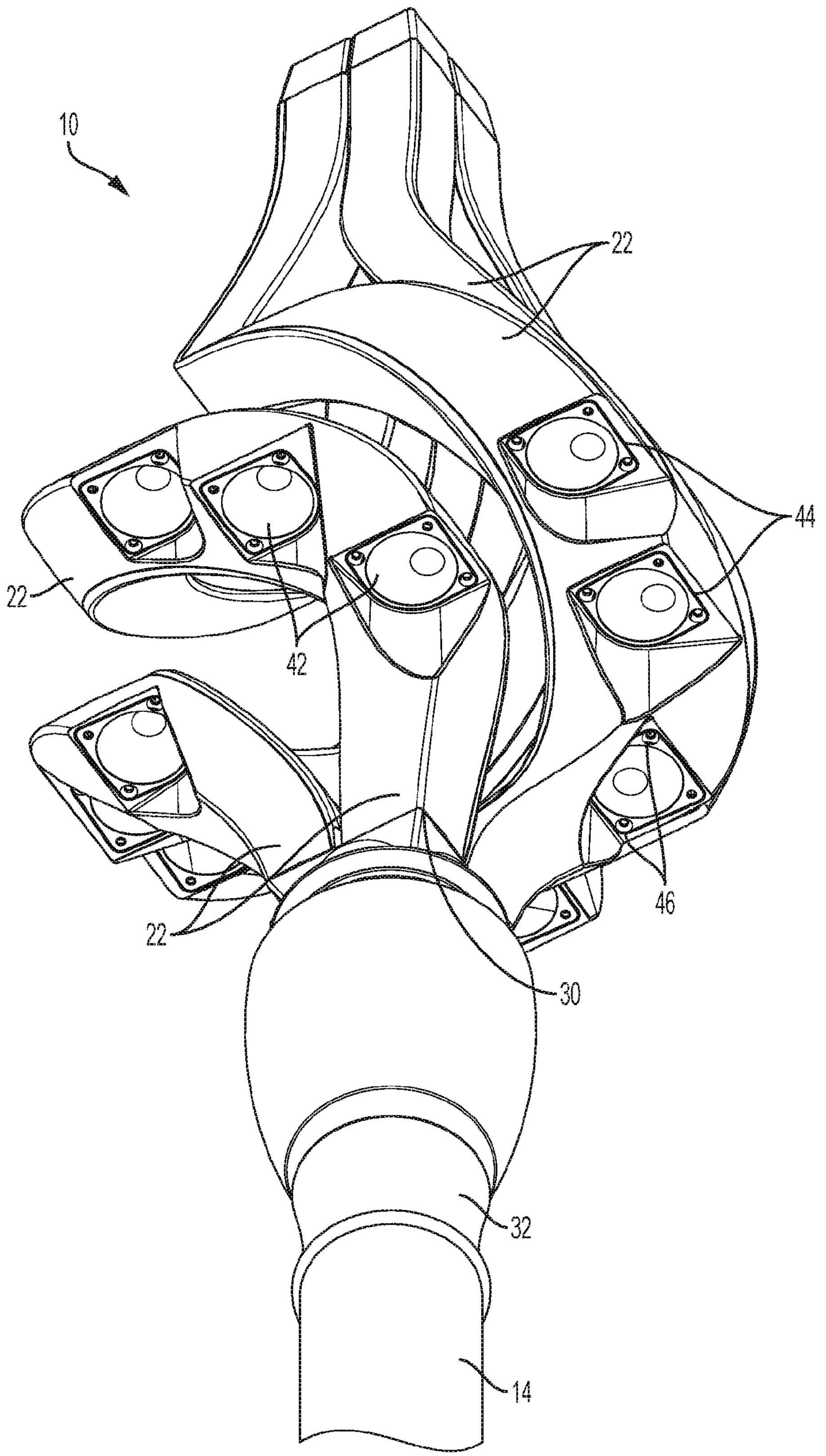
FIG. 3 is a second perspective view of the light fixture of FIG. 1.

FIGS. 1-3 illustrate a luminaire or light fixture 10. In the illustrated embodiment, the light fixture 10 is supported on an upper end of a post or pole 14 (FIG. 1) and the light fixture 10 emits light to illuminate an area of the ground around the base of the pole 14. In other embodiments, the light fixture 10 may be mounted in a different manner.

As shown in FIG. 2, the light fixture 10 includes multiple helical struts 22, and each strut 22 includes an upper end 26 and a lower end 30. The upper ends 26 of the struts 22 are positioned adjacent one another, and the lower ends 30 of the struts 22 are positioned adjacent one another on a base 32. In the illustrated embodiment, the upper ends 26 of the struts 22 are coupled to a common cap. A fixture axis 34 extends between the upper ends 26 and the lower ends 30. For purposes of this description, the terms "axial" and "axially" refer to a direction that is parallel to the fixture axis 34, and the terms "radial" and "radially" refer to a direction that is perpendicular to the fixture axis 34. An axial distance between the upper ends 26 and the lower ends 30 defines a height of the fixture.

An intermediate portion of each strut 22 between the upper end 26 and the lower end 30 forms a spiral or helical shape extending radially outwardly from the fixture axis 34 and extending partially around the fixture axis 34. In the illustrated embodiment, each strut 22 extends approximately 180 degrees about the fixture axis 34. In other embodiments, each strut 22 may be extend through an angle of fewer or more than 180 degrees about the axis 34. In some embodiments, each strut 22 may extend completely around the axis 34, or each strut 22 may extend more than 360 degrees about the axis 34. In the illustrated embodiment, the fixture 10 includes four struts 22; in other embodiments, the fixture may include fewer or more struts. A space or void is centered on the axis 34 and is formed between the intermediate portions of the struts 22. Stated another way, the space is somewhat enclosed by the struts 22, although the space is accessible via gaps between the struts 22.

Figure 4:
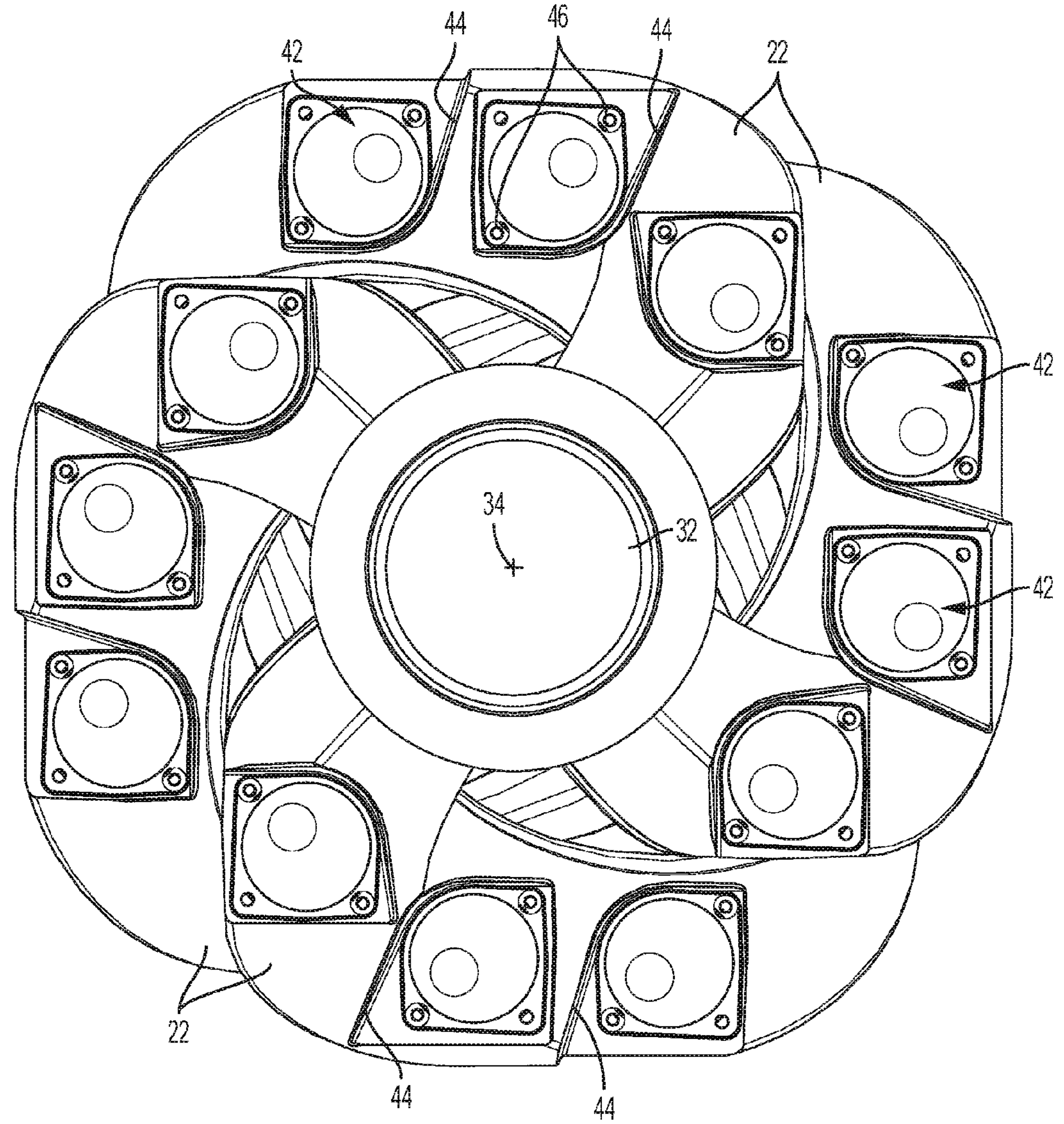
FIG. 4 is a bottom view of the light fixture of FIG. 1.
Figure 5:
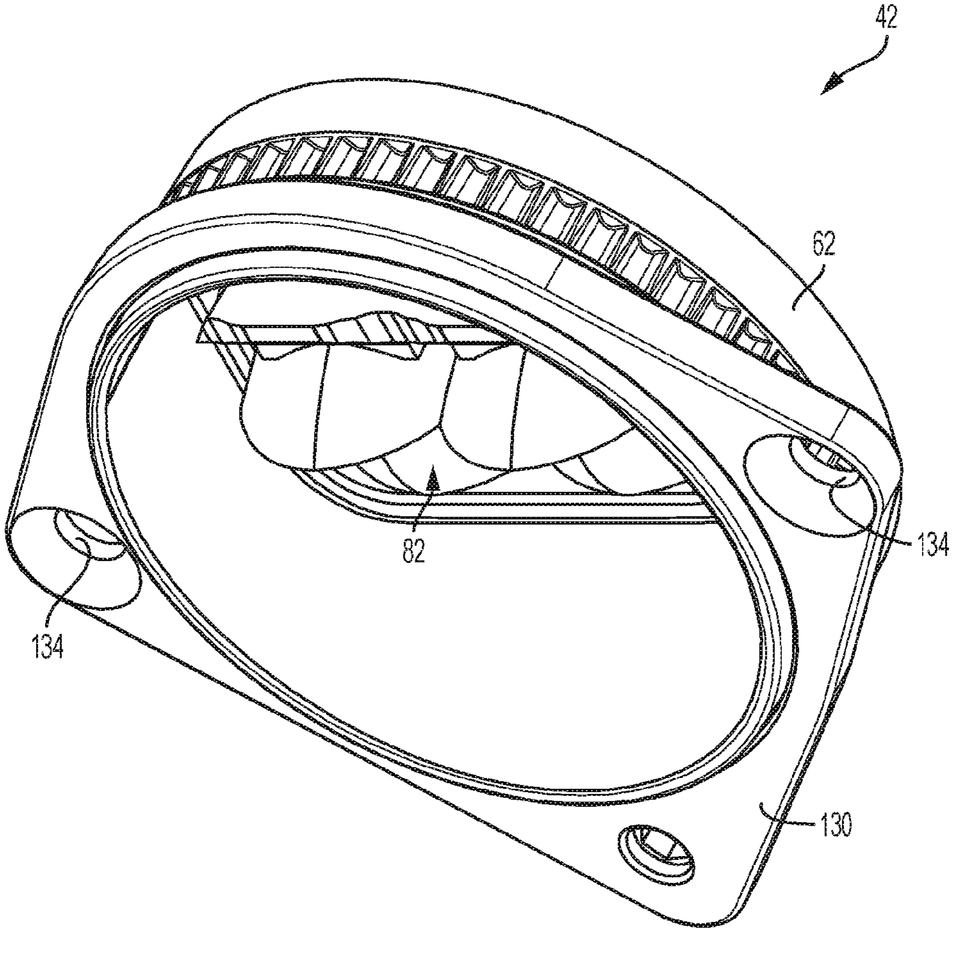
FIG. 5 is a perspective view of a light assembly.

As shown in FIGS. 3 and 4, a portion of each strut 22 includes multiple light modules 42 and multiple sockets 44. Each light module 42 is secured within one of the sockets 44. In the illustrated embodiment, each strut 22 includes three light modules 42, and the modules on each strut 22 are offset from one another both along or parallel to the fixture axis 34 (e.g., vertically) and angularly about the fixture axis 34 (FIG. 2). In some embodiments, at least some of the modules 42 are also offset radially with respect to the fixture axis 34 such that some modules are positioned closer to the axis 34 than others. In the illustrated embodiment, each light module

42 has a circular shape and may be secured within the socket 44 by fasteners 46. In some embodiments, each light module 42 may include four light-emitting elements 46 (e.g., light-emitting diodes or LEDs). The light-emitting elements 46 may be positioned in a cross or diamond configuration.

Figure 6:
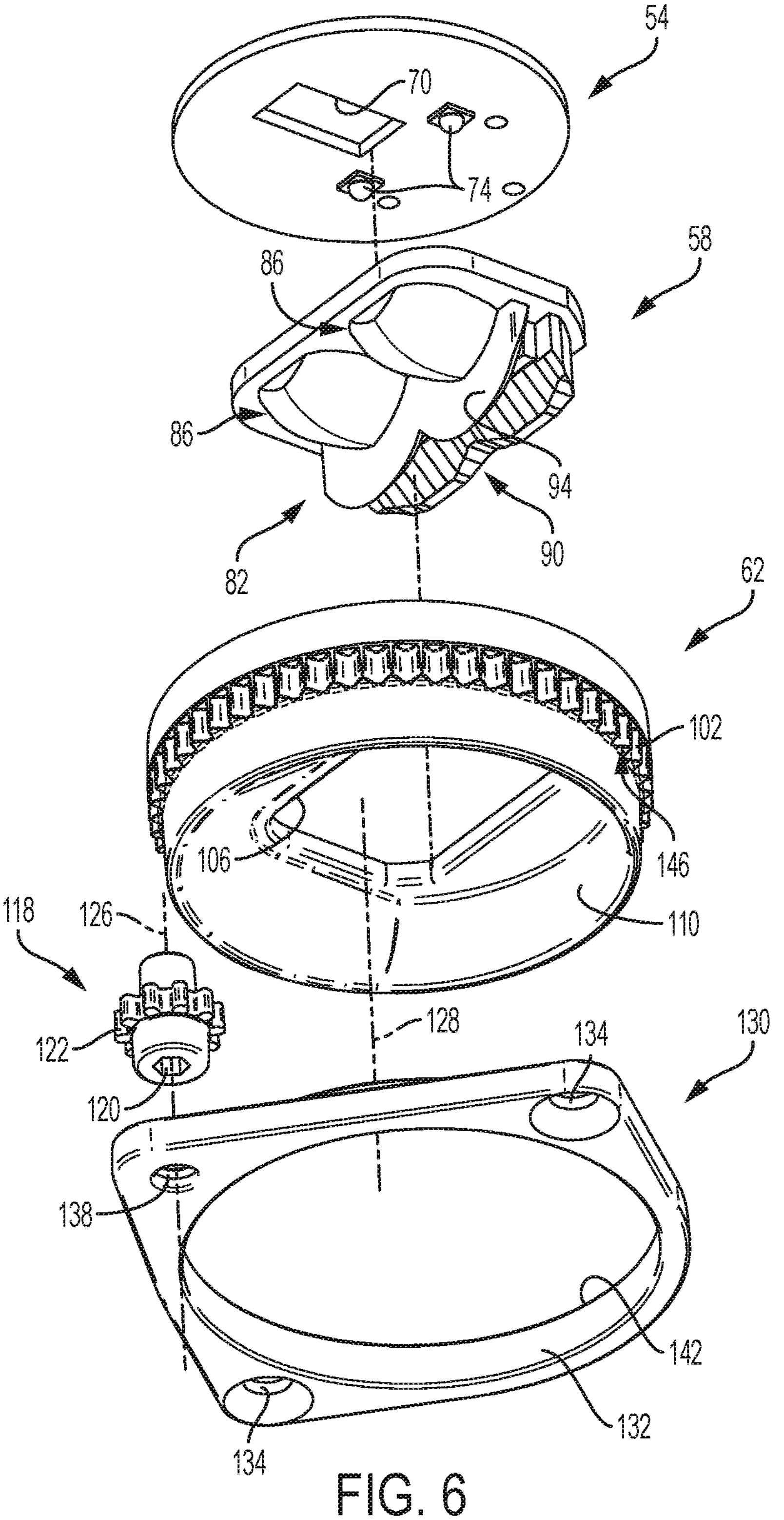
FIG. 6 is an exploded view of the light assembly of FIG. 5.

FIGS. 5-10 illustrate one of the light modules 42. As shown in FIG. 6, the light module 42 includes a support plate or bracket 54, a light assembly 58, and a bezel or enclosure 62 coupled to the bracket 54 to secure the light assembly 58 against the bracket 54. In one embodiment, the bracket 54 includes an opening 70 to allow wires to connect the light assembly 58 to a power source (not shown). Connectors 74 are provided for coupling the light assembly 58 to the bracket 54.

Figure 7:
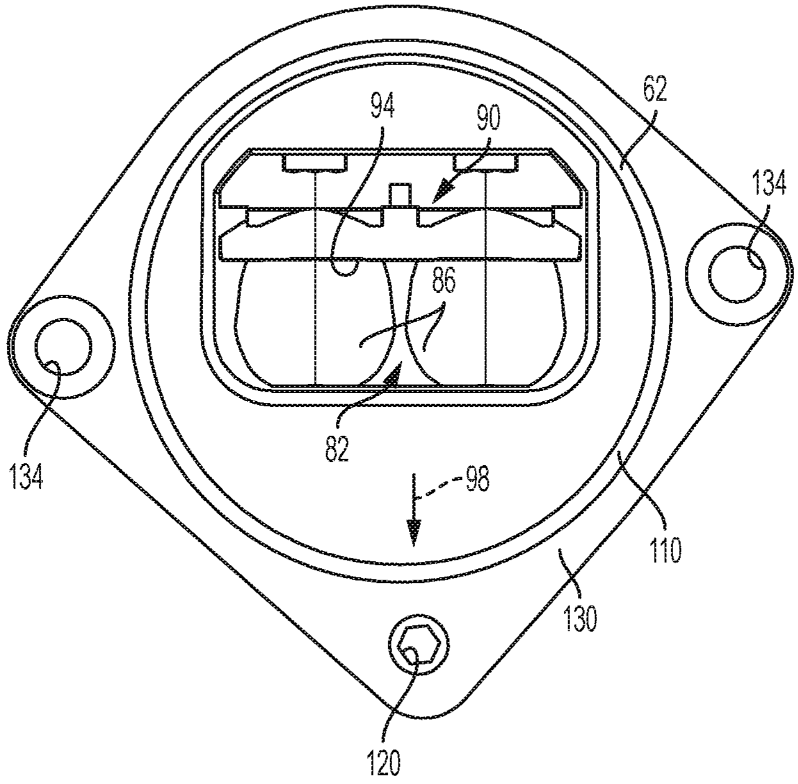
FIG. 7 is an end view of the light assembly of FIG. 5.
Figure 8:
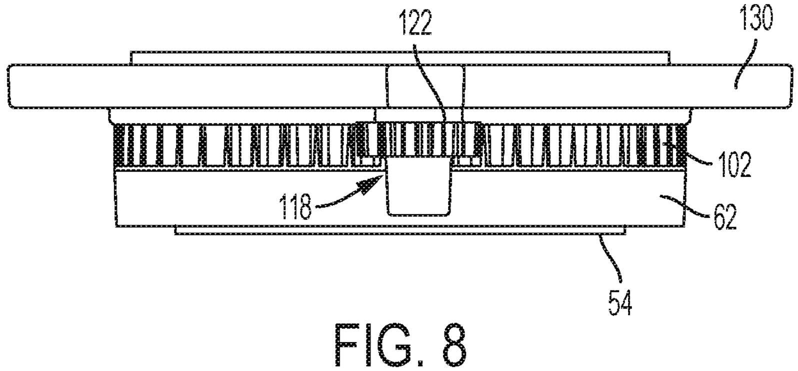
FIG. 8 is a side view of the light assembly of FIG. 5.
Figure 9:
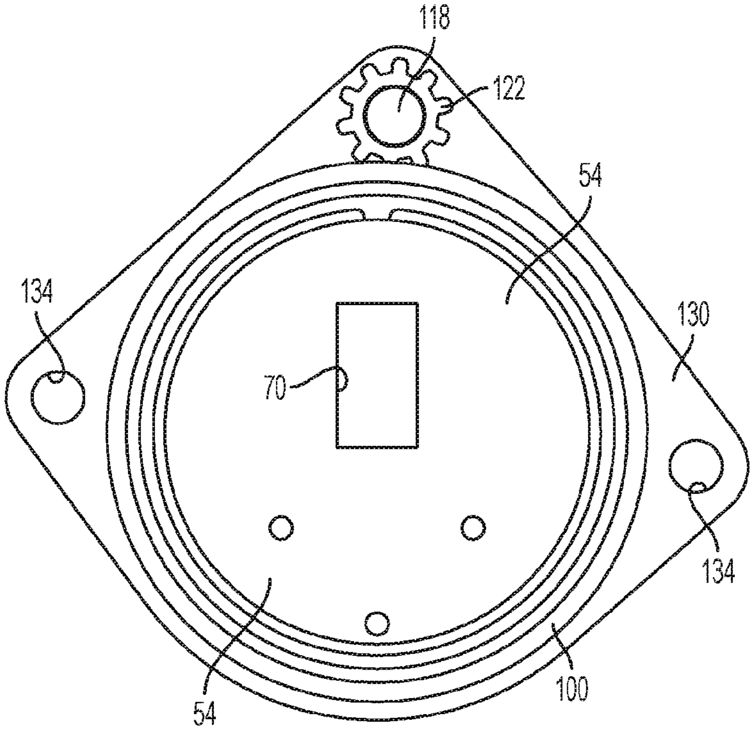
FIG. 9 is another end view of the light assembly of FIG. 5.
Figure 10:
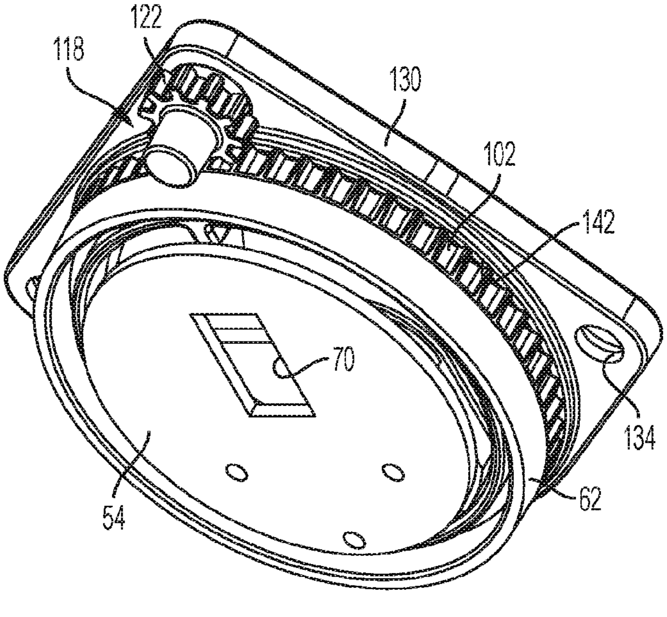
FIG. 10 is another perspective view of the light assembly of FIG. 5.

Referring again to FIG. 6, the light assembly 58 includes a light-emitting element (not shown) covered by an optic 82. In some embodiments, the light-emitting element is a light-emitting diode (LED), which may be mounted on a circuit board positioned adjacent the bracket 54. In the illustrated embodiment, the optic 82 includes a first portion 86 and a second portion 90. The first portion 86 has a dome or partial dome shape, and the second portion 90 includes a flat surface 94 offset from the center of the first potion 86. As shown in FIG. 7, the flat surface 94 is positioned on one side of the first portion 86. The flat reflective surface 94 directs light away from the second portion 90, focusing the light distribution in a desired direction (e.g., the direction 98 indicated in FIG. 7). In the illustrated embodiment, the optic 82 is molded as a single unitary piece, and is formed from an acrylic material. In some embodiments, the optic is formed as multiple pieces. In some embodiments, the optic is formed from a different type of material.

As shown in FIG. 6, the enclosure 62 includes a first gear surface 102 extending along an outer surface or perimeter of the enclosure 62. In the illustrated embodiment, the enclosure 62 has a circular profile and the first gear surface 102 extends along the length of the outer surface. In other embodiments, the enclosure 62 may have a different shape, and the first gear surface 102 may extend around only a portion of the perimeter. The enclosure 62 further includes an opening 106 in which the optic 82 is positioned. In the illustrated embodiment, the enclosure 62 is made from polycarbonate and the opening 106 is rectangular. In some embodiments, the opening 106 may have a different shape, and/or the enclosure 62 may be made from a different material. A reflector 110 extends between the outer edge of the enclosure 62 and the opening 106 and reflects the light emitting through the optic 82. In the illustrated embodiment, the reflector 110 extends entirely around the opening 106 and is formed from polycarbonate. In other embodiments, the reflector 110 may extend around only a portion of the opening 106.

In one embodiment, the light assembly 58 is inserted into the enclosure 62 such that the optic 82 is positioned within the opening 106. The light assembly 58 is then secured to the enclosure 62 (for example, by a sonic welding process). The light assembly 58 and enclosure 62 may then be coupled to one side of the bracket 54, securing the enclosure 62, light assembly 58, and bracket 54 together.

As shown in FIGS. 6 and 8-10, the light module 42 further includes an input gear or pinion 118. The pinion 118 includes a second gear surface 122 engaging the first gear surface 102 such that the teeth of the second gear surface 122 mesh with the teeth of the first gear surface 102. As shown in FIG. 6, the pinion 118 includes a socket 120 positioned on an end of a shaft, and the socket 120 is configured to receive a tool (e.g., a socket drive or screwdriver—not shown) to rotate the pinion 118 about a pinion axis 126. As the pinion 118 rotates about the pinion axis 126 in a first direction, the enclosure 62 (and therefore also the light assembly 58 and the bracket 54) rotate about a second axis 128 extending through the enclosure 62. In the illustrated embodiment, the pinion 118 is a spur gear and the pinion axis 126 and the second axis 128 are parallel to one another; in other embodiments, the gear interface may be a different type of gear surface, and the pinion 118 may be another type of gear (e.g., a worm gear). A user may rotate the pinion 118 to adjust the orientation of the enclosure 62 and optic 82.

Referring again to FIG. 6, a clamp plate or retainer 130 includes an opening 132 within which the enclosure 62 is positioned. The retainer 130 includes an inner surface 142 that bears against an edge 146 of the first gear surface 102 to bias the enclosure 62 against a socket (FIG. 4) of the light fixture 10. The retainer 130 includes a hole 138 to permit a user to access the socket 120 of the pinion 118. In the illustrated embodiment, the retainer 130 also includes holes 134 that are aligned with corresponding holes on the fixture 10. A fastener (e.g., bolt) may be inserted into each hole to secure the retainer 130 relative to the fixture 10.

To adjust the orientation of the light from the light module 42, the retainer 130 should be at least partially untightened relative to the socket 44 of the fixture 10 in order to permit rotation of the enclosure 62. A tool is then inserted into the socket 120 to rotate the pinion 118 until the enclosure 62 and optic 82 are in a desired orientation. This adjustment may be performed during initial manufacture and assembly of the fixture 10 or it may be performed during installation of the light fixture on site. The rotatable light module 42 allows a user to customize the light distribution from the fixture 10 and achieve a desired light output.

Although certain aspects have been described in detail with reference to certain preferred embodiments, variations and modifications exist within the scope and spirit of one or more independent aspects as described.

What is claimed is:

1. A light module for a light fixture, the light module comprising:

a light assembly;

a bezel positioned in substantially the same plane as the light assembly and extending at least partially around the light assembly and secured to the light assembly, the bezel and the light assembly being at least partially pivotable about a first axis orthogonal to the plane, the bezel including an outer surface and a first gear surface extending along at least a portion of the outer surface; and a pinion including a second gear surface engaging the first gear surface, rotation of the pinion causes the bezel and the light assembly to rotate about the first axis; and a retainer including a surface for bearing against the bezel to secure the bezel and the light assembly within a socket of the light fixture, wherein tightening the retainer relative to the socket prevents rotation of the bezel.

2. The light module of claim 1, wherein the light assembly includes a reflective surface for directing light in a predetermined direction, wherein rotation of the bezel and the light assembly changes the orientation of the reflective surface.

3. The light module of claim 1, wherein the pinion is a spur gear rotatable about a second axis.

4. The light module of claim 1, wherein the pinion includes a slot configured to receive a tool for rotating the pinion at least partially about a second axis.

5. The light module of claim 1, wherein the first gear surface extends along the entire perimeter of the bezel, the bezel and the light assembly being rotatable through 360degrees about the first axis.

6. The light module of claim 1, wherein the light assembly includes a circuit board and a light-emitting diode supported on the circuit board.

7. The light fixture of claim 1, wherein the bezel includes a reflective material for directing light emitted by the light assembly.

8. A light fixture comprising:

a support structure including a socket; and a light module positioned within the socket, the light module including a light assembly, a bezel positioned in substantially the same plane as the light assembly and extending at least partially around the light assembly and secured to the light assembly, the bezel and the light assembly being at least partially pivotable about a first axis orthogonal to the plane, the bezel including an outer surface and a first gear surface extending along at least a portion of the outer surface, and a pinion including a second gear surface engaging the first gear surface, rotation of the pinion causes the bezel and the light assembly to rotate about the first axis; and a retainer including a surface for bearing against the bezel to secure the bezel and the light assembly within a socket of the light fixture, wherein tightening the retainer relative to the socket prevents rotation of the bezel.

9. The light fixture of claim 8, wherein the light assembly includes a reflective surface for directing light in a predetermined direction, wherein rotation of the bezel and the light assembly changes the orientation of the reflective surface.

10. The light fixture of claim 8, wherein the pinion is a spur gear rotatable about a second axis.

11. The light fixture of claim 8, wherein the pinion includes a slot configured to receive a tool for rotating the pinion at least partially about a second axis.

12. The light fixture of claim 8, wherein the first gear surface extends along the entire perimeter of the bezel, the bezel and the light assembly being rotatable through 360degrees about the first axis.

13. The light fixture of claim 8, wherein the support structure includes a plurality of helical struts, each strut including at least one socket.

14. The light fixture of claim 13, wherein each strut includes a first end, a second end, and an intermediate portion between the first end and the second end, a fixture axis extending between the first end and the second end, wherein each strut extends in a helical manner at least partially around the fixture axis, the intermediate portions being radially spaced apart from the fixture axis.

15. The light fixture of claim 14, wherein each strut includes multiple sockets, the sockets in each strut being offset from one another in a direction parallel to the fixture axis and angularly offset from one another about the fixture axis.

16. The light fixture of claim 8, wherein the bezel includes a reflective material for directing light emitted by the light assembly.

* * * * *